United States Patent
Day

(10) Patent No.: US 6,888,935 B1
(45) Date of Patent: May 3, 2005

(54) SPEAK-LOUDER SIGNALING SYSTEM FOR CONFERENCE CALLS

(75) Inventor: Mark S. Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 280 days.

(21) Appl. No.: 10/342,885

(22) Filed: Jan. 15, 2003

(51) Int. Cl.[7] .......................... H04L 12/16; H04M 3/56
(52) U.S. Cl. .................... 379/202.01; 370/260
(58) Field of Search .................. 370/259, 260, 370/261, 262, 263, 264, 265, 266, 267, 268, 269, 270, 271; 379/201.01, 203.01, 202.1, 204.01, 205.01, 206.01, 388.06

(56) References Cited

U.S. PATENT DOCUMENTS

| | | | |
|---|---|---|---|
| 4,008,376 A | 2/1977 | Flanagan et al. | 379/206.01 |
| 5,533,112 A * | 7/1996 | Danneels | 379/202.01 |
| 5,539,741 A | 7/1996 | Barraclough et al. | 370/267 |
| 5,987,106 A | 11/1999 | Kitamura | 379/110.01 |
| 6,006,114 A | 12/1999 | Seppanen et al. | 455/567 |
| 6,201,859 B1 | 3/2001 | Memhard et al. | 379/93.21 |
| 6,453,022 B1 | 9/2002 | Weinman, Jr. | 379/88.13 |
| 6,501,739 B1 * | 12/2002 | Cohen | 370/260 |
| 6,674,842 B2 | 1/2004 | Weinman, Jr. | 379/88.13 |
| 6,792,092 B1 * | 9/2004 | Michalewicz | 370/263 |
| 2004/0213402 A1 * | 10/2004 | Ruetschi | 379/388.06 |

* cited by examiner

Primary Examiner—Harry S. Hong
(74) Attorney, Agent, or Firm—Baker Botts L.L.P.

(57) ABSTRACT

A method for alerting a participant in a conference call that the participant is speaking with insufficient volume is disclosed. The method includes determining that someone in a conference call between multiple endpoints is speaking with insufficient volume. The method further includes determining an active participant in the conference call, the active participants based on who is speaking or has spoken within a predetermined time interval and selectively communicating a speak-louder message to the active participant.

28 Claims, 3 Drawing Sheets

| CONFERENCE | ENDPOINT | ACTIVE? | SPEAK-LOUDER ON? |
|---|---|---|---|
| 1 | 1 | Y | N |
| 1 | 2 | N | N |
| 1 | 3 | N | N |
| 2 | 1 | N | Y |
| 2 | 2 | Y | Y |
| 2 | 3 | Y | Y |
| 2 | 4 | N | Y |

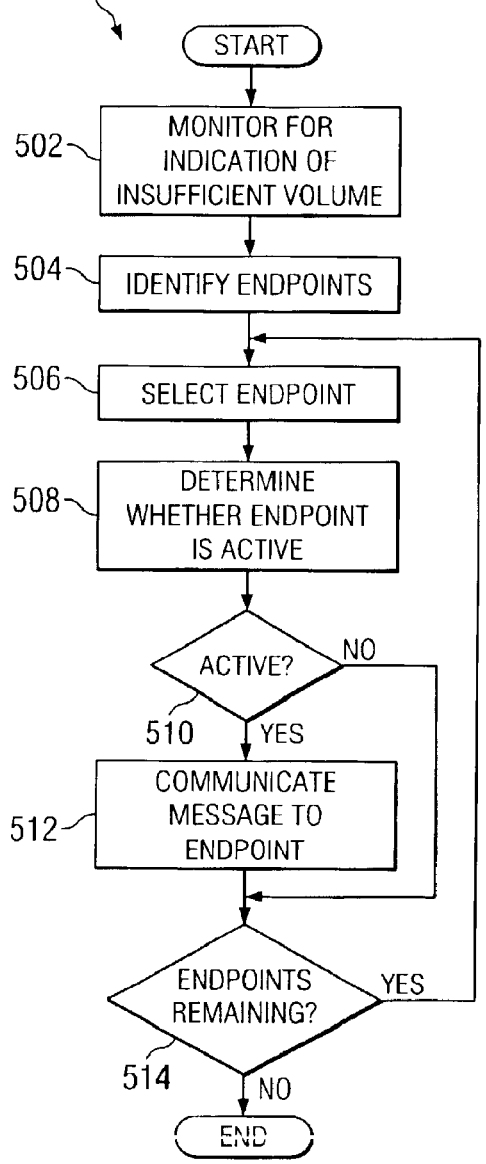
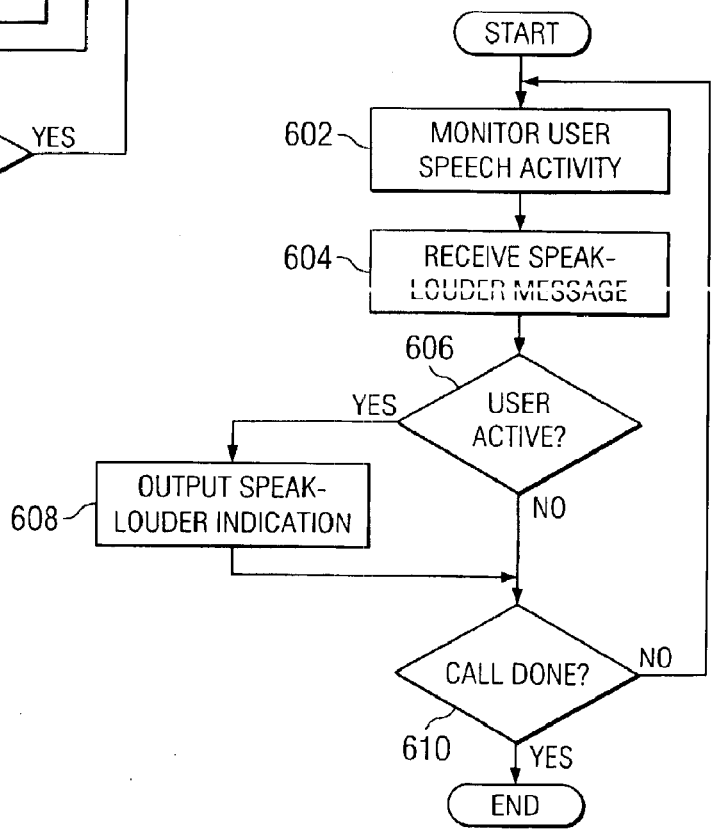

SPEAK-LOUDER SIGNALING SYSTEM FOR CONFERENCE CALLS

BACKGROUND OF THE INVENTION

During a conference call, a speaker may not speak with sufficient volume to be heard by other participants in the conference call. When the speaker is unaware of the condition, other participants in the conference call may alert the speaker that he or she is not speaking loudly enough. Such notifications may interrupt the flow of the conversation, thus reducing the efficiency of information exchange in the conversation. Furthermore, participants may be unwilling to request the speaker to increase his or her volume, because such interjections may be considered rude by the speaker or by other participants.

SUMMARY OF THE INVENTION

In accordance with the present invention, the disadvantages and problems associated with notifying a speaker in a conference call that his or her volume is insufficient have been substantially reduced or eliminated. In particular, particular embodiments of the present invention provide techniques for requesting a speaker to increase the volume of his or her speech.

In accordance with one embodiment of the present invention, a method for alerting a participant in a conference call that the participant is speaking with insufficient volume is disclosed. The method includes determining that someone in a conference call between multiple endpoints is speaking with insufficient volume. The method further includes determining an active participant in the conference call, the active participants based on who is speaking or has spoken within a predetermined time interval and selectively communicating a speak-louder message to the active participant.

In accordance with another embodiment of the present invention, a method for alerting a participant in a conference call that the participant is speaking with insufficient volume includes receiving, at an endpoint, a message indicating that someone in a conference call is speaking with insufficient volume. The method further includes determining whether a participant associated with the endpoint is an active participant who is speaking or has spoken within a predetermined time interval before receiving the indication, and, if the participant is an active participant, outputting a speak-louder indication at the endpoint.

In yet another embodiment, an endpoint includes an interface, a processor, and an output. The interface receives a speak-louder message from a network. The processor determines whether a user of the endpoint is an active speaker who is speaking or has spoken within a predetermined time period. The output outputs a speak-louder indication to the user if the user is an active speaker.

Important technical advantages of certain embodiments of the present invention include anonymous notification of insufficient volume. Because the notification is anonymous, a participant notifying the speaker of insufficient volume is not subject to any "social cost" for requesting the speaker to speak more loudly. The notification may be provided exclusively to active speakers, so that a quiet speaker is not subject to additional embarrassment associated with being notified of insufficient volume. This type of discreet feedback also eliminates the distraction associated with providing superfluous "speak-louder" notifications to non-speaking participants.

Other important technical advantages of certain embodiments of the present invention include integration of notification services into conventional communication devices. For example, Internet protocol telephones may be adapted to include lights or display screens that light in response to notification messages. Such devices may include buttons or other methods of entry allowing users to provide "speak-louder" notifications. In particular embodiments, the notification system may be integrated with the volume control system, such that the device automatically provides notification of insufficient volume in response to detecting that the user of the device has increased the volume.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 is a flow chart showing a method for receiving notifications at a notification server and providing the notifications to active speakers; and FIG. 6 is a flow chart illustrating a method for providing notifications managed by endpoints.

DETAILED DESCRIPTION OF THE INVENTION

Figure 1:
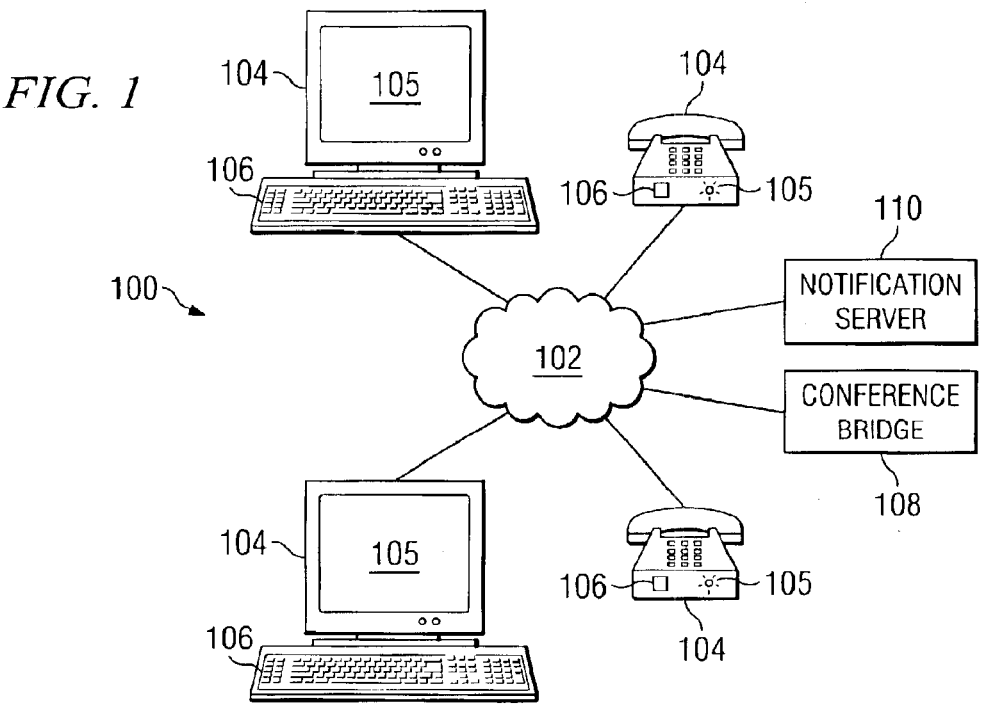
FIG. 1 shows a particular embodiment of a system that allows participants in a conference call to provide notification to a speaker.

FIG. 1 shows a telecommunications system 100 that allows endpoints 104 to exchange voice information in a conference call over a telecommunications network 102. In general, system 100 allows users of endpoints 104 to alert one or more participants in a conference call that they are speaking with insufficient volume. The term "conference call" refers to an exchange of voice information among endpoints 104, which may also be accompanied by video, data, signaling, or other suitable forms of information. "Participants" refer to users of endpoints 104 who are speaking or listening in the conference call. "Active participants" or "active speakers" refer to participants who are currently speaking or who have been speaking in the conversation recently, as determined with reference to a specified time period. In the depicted embodiment, system includes a conference bridge 106 that manages communication between endpoints 104 and a notification server 110 that manages certain messages exchanged by endpoints 104, which are described in detail below.

Network 102 represents any collection of hardware and/or software that provides a medium for endpoints 104 to exchange information. Network 102 may includes routers, hubs, switches, gateways, or any other suitable components for information exchange, and may use any protocol or method for communication, including Internet protocol (IP), Session Initiation Protocol (SIP), plain old telephone systems (POTS), synchronous optical network (SONET), asynchronous transfer mode (ATM), wireline communication, wireless communication. In particular embodiments, network 102 is a packet-based network that communicates information in the form of packets, cells, frames, fragments, or other segments or portions of data (generally referred to as "packets").

Endpoints 104 represent any devices that allow users to exchange voice information with users of other endpoints 104. Examples of endpoints 104 include personal computers (PCs) running appropriate communication software, conventional telephones, IP phones, wireless communication devices, or any other suitable device. Endpoints 104 may also include multiple devices used together for a single conference call, such as a PC running a websharing application in conjunction with a voice-over-IP (VoIP) conference call. Endpoints 104 may include processing capability for various tasks relating to exchanging voice information, including converting voice information to packetized form, detecting speech activity, determining volume levels for the speech of the user, analyzing and comparing background noise levels to the user's speech, or any other related task. An output 105 allows endpoint 104 to provide signals or alerts to a user of endpoint 104. For example, output 105 may be a screen or flashing light that alerts the user to the existence of a particular condition. An input 106 receives input from the user by any suitable technique. For example, input 106 may represent a button, dial, keyboard, keypad, mouse, or other device or component allowing endpoint 104 to detect a particular type of action by the user.

Conference bridge 108 represents any network resource, including hardware and/or software, that manages conference calls between endpoints 104. Examples of managerial tasks include establishing communication connections between endpoints 104, identifying the source of information received by bridge 108, routing information to particular endpoints 104, identifying active speakers, determining background noise levels, or any other appropriate or useful task related to managing a conference call. Although illustrated as a discrete component, the functions of conference bridge 108 may also be distributed among other components of system 100. For example, in a peer-to-peer communication protocol such as Session Initiation Protocol (SIP), one or more endpoints 104 may undertake some or all of the tasks performed by bridge 108.

Notification server 110 represents hardware and/or software that manages a messaging infrastructure in system 100. Notification server 110 maintains information on various endpoints 104 in order to allow messages to be exchanged among endpoints 104 outside of the conference call. In particular embodiments, notification server 110 maintains records and handles message exchanges for multiple conference calls simultaneously, allowing a single notification server 110 to work in conjunction with multiple conference bridges 108. Alternatively, the functions of notification server 110 may be distributed among components of system 110 in a distributed or peer-to-peer architecture. Notification server 110 may exchange information with conference bridge 108 in order to determine information about endpoints 104, such as determining which endpoints 104 are active.

In operation, endpoints 104 exchange voice information from their respective users in a conference call. During the conference call, participants in the conference call may determine that the speaker is not speaking loudly enough. In response to detecting the insufficient volume, a participant may use input 105 of endpoint 104 to indicate that the speaker is not speaking loudly enough. Endpoint 104 detects the indication, generates an "insufficient volume" message, and communicates the message to notification server 106, or, if endpoint 104 can resolve participants, directly to the participant in a peer-to-peer arrangement.

Notification server 106 communicates with conference bridge 108 in order to determine which endpoints 104 are associated with active participants in the conference call, and then broadcasts the message to endpoints 104 associated with active participants. Endpoints 104 receiving the message then use output device 106 to display or otherwise provide an indication to their respective users that those users are speaking with insufficient volume. By communicating the message only to active participants, non-active participants are saved from the annoyance of receiving requests to speak more loudly when they are not even the ones speaking, and active participants are spared from any embarrassment associated from being publicly instructed to speak louder.

In an alternative method of operation, notification server 108 receives the "insufficient volume" message from endpoint 104, and broadcasts the message to all endpoints 104 participating in the conference call. Each endpoint 104 separately determines whether its respective user is currently an active participant in the conference call. If endpoint 104 determines that its user is an active participant, then endpoint 104 alerts its user that the user is speaking too softly. In particular embodiments, endpoint 104 may increase the gain on a speaker's microphone or take other suitable corrective action to make the speaker more audible. If endpoint 104 determines that its user is not currently an active participant, endpoint 104 suppresses the message so that its user will not receive a superfluous indication to speak loudly.

In another alternative embodiment, endpoint 104 broadcasts the message to all participants, whether active or not, and all endpoints 104 receiving the message provide the "speak-louder" indication to their respective users. Although this embodiment allows for some superfluous "speak-louder" indications, it still allows participants indicating insufficient volume to a speaker without interrupting the normal flow of conversation. One example of such an embodiment would be broadcasting a low-frequency sound, such as an 80 Hertz (Hz) signal, to other participants in the conference call. The 80 Hz tone may be communicated using any voice transmission method including POTS. The frequency is selected to be close to the 60 Hz background hum that results from POTS lines being placed in proximity to power lines. Because the 60 Hz background hum and the 80 Hz tone are close together in frequency, the 80 Hz tone is less likely to be distracting to participants, but the tone is also sufficiently distinct to be detectable as a separate tone from the background. Endpoints 104 may be modified to detect the 80 Hz tone and to provide a nonverbal notification, such as a flashing light, in response to detecting the tone. In such embodiments, notification server 108 may be omitted entirely.

In yet another alternative embodiment, components of system 100 automatically detect insufficient volume in place of or in addition to receiving "insufficient volume" messages from participants. Thus, for example, bridge 108 or server 110, alone or in conjunction, may analyze the volume level of active participants, compare the volume level to a background noise level, and provide an "insufficient volume" indication to any participants that are not speaking loudly enough to distinguish the speaker from the background noise.

In still another alternative embodiment, endpoints 104 may automatically send an "insufficient volume" message in response whenever their respective users make particular adjustments to the output volume level of endpoint 104. For example, when a user increases a volume setting to the maximum level, makes repeated increases to the volume, or increases the volume rapidly and significantly, endpoint 104 may treat the user's action as an implicit indication that the user wants the speaker to speak more loudly. In response to the indication from the user, endpoint 104 generates an "insufficient volume" message and communicates the message according to any of the methods described above.

Although various embodiments have been described in detail, the described embodiments are only examples of numerous possible variations of a system for providing "speak-louder" notifications. Many of the described functions may be performed by other components, either alone or in combination, and some components omitted, without changing the overall operation of system 100. For example, system 100 may be designed with a peer-to-peer architecture in which endpoints 104 collectively or singly perform the functions associated with notification server 110. Similarly, the features of various embodiments may be combined or adapted in order to achieve desired advantages or to adapt to particular communication environments, and such combinations or adaptations do not depart from the scope of the embodiments described.

Figure 2:
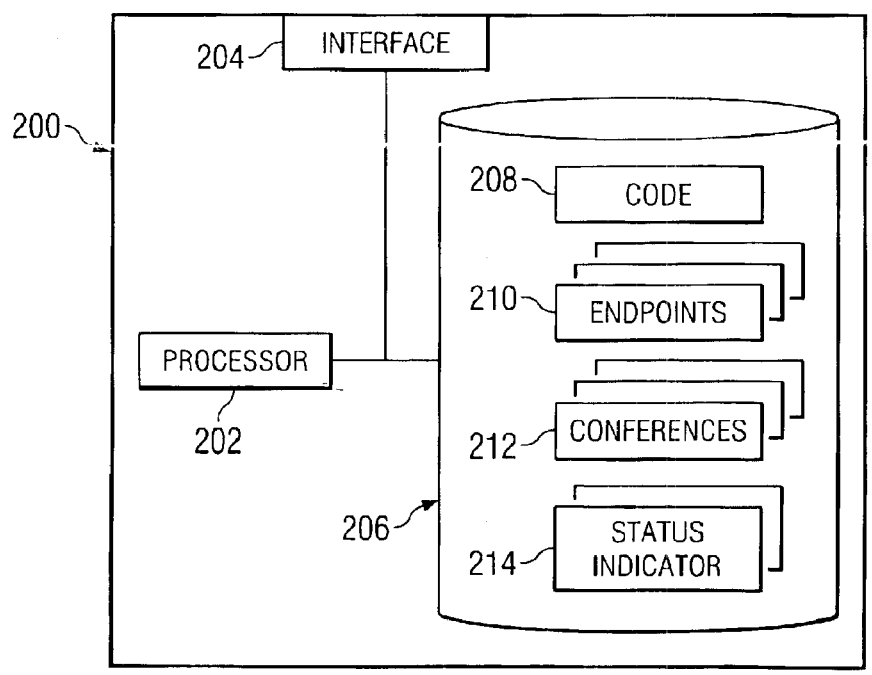
FIG. 2 shows a particular embodiment of a notification server in the system of FIG. 1.

FIG. 2 shows an embodiment of a notification server 200 that manages messages exchanged among endpoints 104. Notification server 200 includes a processor 202, an interface 204 and a memory 206. Processor 202 represents any collection of hardware and/or software for processing information. Processor 202 may include a microprocessor, micro-controller, digital signal processor, or any other suitable component. Interface 204 represents any port, real or virtual, allowing notification server 200 to exchange information with components of system 100. Memory 206 represents any form of information storage, whether volatile or non-volatile, and may include optical media, magnetic media, removable media, CD-ROMs, DVD-ROMs, or any other suitable storage medium.

Memory 206 stores code 208 executed by processor 202 to perform various tasks. Memory 206 also stores information relating to endpoints 104 for which notification server 200 manages messages. This information includes endpoint identifiers 210, conferences 212 in which endpoints 104 are participating, and a status indicator 214 that indicates whether a "speak-louder" message has been triggered for each conferences.

Figures 3, 4:
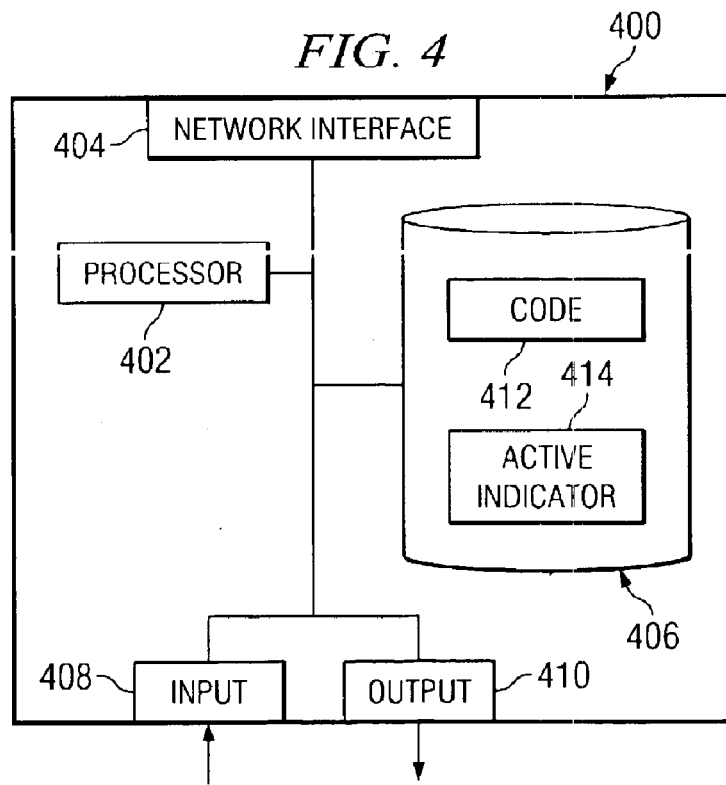
FIG. 3 shows one example of a table used by the notification server of FIG. 2 to provide notifications to active speakers.
FIG. 4 shows one embodiment of an endpoint in the system of FIG. 1.

FIG. 3 shows an example of a table 300 that may be used to organize the information in memory 206. Conferences 302 identify each conference for which notification server 200 manages messages, and endpoint identifiers 304 identify endpoints 104 in each conference 302. The "Active" indicator 306 indicates whether a user associated with each endpoint 104 is speaking. The "Speak-Louder" flag 308 is a status indicator 214 for the conference 302 to indicate whether an "insufficient volume" message has been received from one of the endpoints 104 in the conference 302.

In operation, notification server 200 receives an "insufficient volume" indication from a particular one of endpoints 104. Notification server 200 identifies the associated conference 302 in which the particular endpoint 104 is participating, and sets the status indicator 308 for the associated conference 302 to reflect that an "insufficient volume" message has been received. Notification server 200 then identifies the active endpoints using the active indicator 306. Finally, notification server 200 communicates the "insufficient volume" message to one, some, or all endpoints 104 in accordance with the various methods described above.

In an alternative embodiment, notification server 200 performs the speak-louder notifications automatically in conjunction with conference bridge 108. Conference bridge 108 monitors information received from endpoints 304 and compares the volume of participants in the conference call with a background noise level. When conference bridge 108 detects that the volume of an active participant has dropped within a certain threshold level of the background volume, conference bridge 108 generates an "insufficient volume" message. Notification server 200 receives the "insufficient volume" message using interface 204, and communicates the message to selected endpoints 304 as described above.

FIG. 4 shows one example of an endpoint 400. Endpoint 400 includes a processor 402, a network interface 404, a memory 406, an input 408, and an output 410. Processor 402 represents any collection of hardware and/or software for processing information. Processor 402 may include a microprocessor, micro-controller, digital signal processor, or any other suitable component. Network interface 404 represents any port, real or virtual, allowing endpoint 400 to exchange information with components of system 100. Memory 406 represents any form of information storage, whether volatile or non-volatile, and may include optical media, magnetic media, removable media, CD-ROMs, DVD-ROMs, or any other suitable storage medium. Memory stores code 412 executed by processor 402 and also maintains an active indicator 414 that indicates whether the user of endpoint 400 is currently speaking.

Input 408 represents any method for receiving information from a user, including buttons, dials, keypads, keyboards, touch screens, web interfaces, or any other suitable technique for information entry. Output 410 represents any suitable method for conveying information to a user of endpoint 400, including speakers, lights, displays, or any other suitable technique of outputting information. Input 408 and output 410 may share hardware and/or software that performs both input and output functions.

In operation, endpoint 400 participates in conference calls and exchanges "insufficient volume" messages with other endpoints 400 in a conference call. During the conference call, endpoint 400 receives voice information from its user, performs any suitable conversion of the information into a format suitable for communication to other endpoints 400, and communicates the information using network interface 404. Endpoint 400 similarly receives information from other endpoints 400 using network interface 404. While the user of endpoint 400 is speaking, endpoint 400 triggers active indicator 414 to indicate that the user is an active participant in the conference call. Endpoint 400 may also exchange information with conference bridge 108 to assist conference bridge 108 in identifying active speakers, diagnosing problems, or performing any other suitable task.

Endpoint 400 sends an "insufficient volume" message in response to receiving an indicator from its user that one or more speaking participants in a conference call are speaking too softly. The indication may be received directly from input 408, or alternatively, the indication may be identified implicitly from characteristic user behavior, such as a particular pattern of volume adjustments. In response to the indication, endpoint 400 generates an "insufficient volume" message and communicates the message to other endpoints 400 using network interface 404.

Endpoint 400 may also receive "insufficient volume" indications from other endpoints 400. Such messages may be directed particularly to the receiving endpoint 400, in which case endpoint 400 automatically outputs a speak-louder indication using output device 410. If the "insufficient volume" message was not particularly directed to endpoint 400, endpoint 400 determines whether its user is an active speaker based on active indicator 414. If the user is an active speaker, endpoint 400 outputs the speak-louder indications to output 410. If the user is not an active speaker, endpoint 400 suppresses the output.

FIG. 5 is a flow chart 500 that shows one example of a method of operation for notification server 200. Server 200 monitors for an indication of insufficient volume in a particular conference at step 502. Server 200 may receive the indication from endpoints 104 or conference bridge 108. If an indication is received, server 200 identifies endpoints 104 in the conference call at step 504. Server 200 selects an endpoint 104 at step 506 and determines whether the selected endpoint 104 is active at step 508. If the endpoint is active at decision step 510, server 200 communicates an "insufficient volume" message to the selected endpoint at step 512. Otherwise, server 200 does not communicate the message. At step 514, server 200 determines if there are any other endpoints 104 in the conference call. If there are other endpoints 104, server 200 selects a new endpoint 104 at step 506 and repeats the method from there.

FIG. 6 is a flow chart 600 that shows one example of a method of operation for endpoint 400. Endpoint 400 monitors its user's speech activity at step 602. During the monitoring, endpoint 400 receives a speak-louder message at step 604. Endpoint 400 determines whether its user is an active speaker at step 606. If the user is an active speaker, endpoint 400 outputs a speak-louder indication to the user. Otherwise, endpoint 400 does not output the speak-louder indication. Endpoint 400 then determines whether the conference call is completed at step 610. If the call continues, endpoint 400 repeats the method from monitoring step 602. Otherwise, the method is complete.

The methods of operation presented in FIGS. 5 and 6 are only some examples of methods of operation for system 100, but numerous other examples are possible. For instance, endpoints 104 may exchange information in a peer-to-peer arrangement, such as endpoints 104 determining which speakers are active and selectively communicating speak-louder messages to endpoints 104 associated with those speakers. Additional steps, such as automatic adjustment of microphone gain, may be added, particular steps may be omitted, and individual steps may be performed in a different order or by different components than the ones described. The method of operation may also include any of the various methods described above.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for alerting a participant in a conference call that the participant is speaking with insufficient volume, comprising:

determining that someone in a conference call is speaking with insufficient volume, the conference call comprising an exchange of information among a plurality of endpoints;

determining an active participant in the conference call who is speaking or has spoken within a predetermined time interval; and selectively communicating a speak-louder message to the active participant.

2. The method of claim 1, wherein the step of determining that someone in the conference call is speaking with insufficient volume comprises:

receiving a message from one of the endpoints; and determining based on the message that someone in the conference call is speaking with insufficient volume.

3. The method of claim 1, wherein the step of determining that someone in the conference call is speaking with insufficient volume comprises:

comparing a first volume associated with a participant with a second volume associated with a background noise level; and based on the comparison, determining that the participant is speaking with insufficient volume.

4. The method of claim 1, further comprising:

determining more than one active participant in the conference call; and selectively communicating the the speak-louder message to all of the active participants.

5. A method for alerting a participant in a conference call that the participant is speaking with insufficient volume, comprising:

receiving at an endpoint a message indicating that someone in a conference call is speaking with insufficient volume;

determining whether a participant associated with the endpoint is an active participant who is speaking or has spoken within a predetermined time interval before receiving the indication; and if the participant is an active participant, outputting a speak-louder indication at the endpoint.

6. The method of claim 5, wherein the step of determining comprises:

determining a background noise level;

comparing a speech volume for the participant to the background noise level; and based on the comparison, determining that the participant is an active participant.

7. The method of claim 5, wherein:

the message comprises a tone of a selected frequency; and the step of outputting comprises:

suppressing the tone in a sound output; and displaying a visible indication at the endpoint.

8. The method of claim 5, wherein the message comprises an out-of-band message communicated to the endpoint by a notification server.

9. A method for alerting a participant in a conference call that the participant is speaking with insufficient volume, comprising:

receiving from a user of a first endpoint an indication that someone in a conference call is speaking with insufficient volume;

generating a signal in response to the indication; and communicating the signal to a second endpoint associated with a participant who is speaking with insufficient volume.

10. The method of claim 9, wherein the step of receiving comprises:

detecting that the user has adjusted an output volume of the first endpoint; and based on the adjustment, determining that the user has indicated that a participant in the conference call is speaking with insufficient volume.

11. The method of claim 9, wherein:

the step of receiving comprises detecting that the user has pressed a button; and the signal comprises a tone of a selected frequency.

12. The method of claim 9, wherein the step of communicating comprises:

identifying a notification server for a network over which the conference call is being conducted; and communicating the signal to the notification server.

13. The method of claim 9, wherein:

the signal comprises a first signal; and the method further comprises:

receiving a second signal indicative of insufficient volume;

determining whether the user of the first endpoint is an active participant in the conference call who is speaking or who has spoken within a predetermined time interval; and if the user of the first endpoint is an active participant, outputting a speak-louder indication to the user of the first endpoint.

14. The method of claim 8, wherein the step of communicating comprises communicating the signal to all other endpoints in the conference call.

15. A device, comprising:

a processor operable to:

determine that someone in a conference call is speaking with insufficient volume, the conference call comprising an exchange of information among a plurality of endpoints; and determine an active participant in the conference call who is speaking or has spoken within a predetermined time interval; and an interface operable to selectively communicate a speak-louder message to the active participant.

16. The device of claim 15, wherein:

the interface is further operable to receive a message from one of the endpoints; and the processor is operable to determine based on the message that someone in the conference call is speaking with insufficient volume.

17. The device of claim 15, wherein the processor is further operable to:

compare a first volume associated with one of the participants with a second volume associated with a background noise level; and based on the comparison, determine that the participant is speaking with insufficient volume.

18. The device of claim 15, wherein:

the processor is further operable to determine multiple active participants in the conference call; and the interface is further operable to selective communicate the speak-louder message to all of the active participants.

19. An endpoint, comprising:

an interface operable to receive a speak-louder message from a network;

a processor operable to determine whether a user of the endpoint is an active speaker who is speaking or has spoken within a predetermined time period; and an output operable to output a speak-louder indication to the user if the user is an active speaker.

20. The endpoint of claim 19, wherein:

the speak-louder message comprises a tone of a selected frequency; and the output is further operable to:

suppress the tone in a sound output; and display a visible indication at the endpoint.

21. The endpoint of claim 19, wherein the speak-louder message comprises an out-of-band message communicated to the endpoint by a notification server.

22. An endpoint, comprising:

an input operable to receive from a user of the endpoint an indication that someone in a conference call is speaking with insufficient volume;

a processor operable to generate a signal indicative of the insufficient volume; and an interface operable to communicate the signal to another endpoint associated with a participant who is speaking with insufficient volume.

23. The endpoint of claim 22, wherein the input is further operable to:

detect that the user has adjusted an output volume of the endpoint; and based on the adjustment, determine that the user has indicated that someone in the conference call is speaking with insufficient volume.

24. The endpoint of claim 22, wherein:

the processor is further operable to identify a notification server for a network over which the conference call is being conducted; and the interface is operable to communicate the signal to the notification server.

25. The endpoint of claim 22, wherein the interface is further operable to communicate the speak-louder message to all other endpoints in the conference call.

26. A system, comprising:

means for determining that someone in a conference call is speaking with insufficient volume, the conference call comprising an exchange of information among a plurality of endpoints;

means for determining an active participant in the conference call who is speaking or has spoken within a predetermined time interval; and means for selectively communicating a speak-louder message to the endpoints associated with the active participants.

27. The system of claim 26, wherein the means for determining comprises:

means for receiving a message from one of the endpoints; and means for determining based on the message that someone in the conference call is speaking with insufficient volume.

28. The system of claim 26, wherein the means for determining that someone in a conference call is speaking with insufficient volume comprises:

means for comparing a first volume associated with one of the participants in the conference call with a second volume associated with a background noise level; and means for determining that the participant is speaking with insufficient volume based on the comparison.

* * * * *

UNITED STATES PATENT AND TRADEMARK OFFICE
CERTIFICATE OF CORRECTION

PATENT NO. : 6,888,935 B1
APPLICATION NO. : 10/342885
DATED : May 3, 2005
INVENTOR(S) : Mark S. Day It is certified that error appears in the above-identified patent and that said Letters Patent is hereby corrected as shown below:

Column 8, Line 24, Claim 4, after "communicating" delete "the".

Signed and Sealed this

Eighth Day of August, 2006

JON W. DUDAS
*Director of the United States Patent and Trademark Office*